(12) United States Patent
Archer et al.

(10) Patent No.: US 11,596,037 B2
(45) Date of Patent: Feb. 28, 2023

(54) VOLTAGE RIPPLE DETECTION AND DRIVER CONTROL FOR STABLE OUTPUT CURRENT

(71) Applicant: ERP POWER, LLC, Moorpark, CA (US)

(72) Inventors: Michael Archer, Moorpark, CA (US); Louis Chen, Simi Valley, CA (US); James H. Mohan, Valencia, CA (US)

(73) Assignee: ERP POWER, LLC, Moorpark, CA (US)

( * ) Notice: Subject to any disclaimer, the term of this patent is extended or adjusted under 35 U.S.C. 154(b) by 35 days.

(21) Appl. No.: 17/464,505

(22) Filed: Sep. 1, 2021

(65) Prior Publication Data

US 2022/0095431 A1  Mar. 24, 2022

Related U.S. Application Data

(60) Provisional application No. 63/082,835, filed on Sep. 24, 2020.

(51) Int. Cl.
*H05B 45/36* (2020.01)
*H05B 45/3725* (2020.01)
(Continued)

(52) U.S. Cl.
CPC ............ *H05B 45/36* (2020.01); *H05B 45/10* (2020.01); *H05B 45/355* (2020.01); *H05B 45/3725* (2020.01)

(58) Field of Classification Search
CPC .... H05B 45/382; H05B 45/355; H05B 45/39; H05B 45/10; H05B 45/325; H05B 45/38; H05B 45/3725; H05B 33/10; H05B 45/385; H05B 45/31; H05B 45/14; H05B 45/32; H05B 45/36; H05B 45/392; H05B 45/50; H02M 1/4225; H02M 1/0025; H02M 1/007; H02M 1/4208; H02M 1/4216; H02M 1/0012; H02M 1/08; H02M 1/44; H02M 3/157; H02M 3/1586; H02M 3/01; H02M 7/06; H02M 7/217; H02M 1/0009; H02M 5/458; H02M 1/009; H02M 1/32; H02M 3/33571; H02M 1/14; H02M 1/4258; H02M 3/33523; H02M 3/33573; H02M 1/42; H02M 1/4291; H02M 1/0032;
(Continued)

(56) References Cited

U.S. PATENT DOCUMENTS

| 2006/0087298 | A1* | 4/2006 | Turchi | H02M 1/4225 323/265 |
|---|---|---|---|---|
| 2008/0272748 | A1* | 11/2008 | Melanson | H02M 1/4225 323/205 |
| 2008/0288201 | A1* | 11/2008 | Oettinger | H02M 3/157 702/109 |
| 2009/0134818 | A1* | 5/2009 | Biggs | H05B 41/28 363/39 |
| 2010/0141247 | A1* | 6/2010 | Candy | G01V 3/104 324/239 |
| 2011/0080112 | A1* | 4/2011 | Shearer | H05B 45/10 323/273 |

(Continued)

*Primary Examiner* — Monica C King
(74) *Attorney, Agent, or Firm* — Lewis Roca Rothgerber Christie LLP

(57) ABSTRACT

According to some embodiments, there is provided a power supply system including a converter configured to generate an output signal based on a rectified input signal for driving a light source, an output correction circuit coupled to an output of the converter and configured to measure a ripple in the output signal and to generate a correction signal to dynamically control a DC-level of the output signal of the converter based on the measured ripple and a reference signal corresponding to a desired DC-level of the output signal.

19 Claims, 2 Drawing Sheets

(51) Int. Cl.
*H05B 45/10* (2020.01)
*H05B 45/355* (2020.01)

(58) Field of Classification Search
CPC ...... H02M 1/008; H02M 1/088; H02M 1/327;
H02M 3/07; H02M 3/335; H02M 3/3378;
H02M 5/4585; H02M 7/4815; H02M
7/537; H02M 7/53832; H02M 7/53871;
H02M 1/0058; H02M 1/0077; H02M
3/285; H02M 1/12; H02M 1/143; H02M
1/4241; H02M 3/33507; H02M 3/33569;
H02M 3/3376; H02M 1/0016; H02M
1/0048; H02M 1/083; H02M 1/10; H02M
3/1582; H02M 3/33592; H02M 7/08;
H02M 7/2176; H02M 7/219; H02M 7/23;
H02M 7/493; H02P 6/085; H02P 23/26;
H02P 27/06; H02P 5/74; H02P 6/14;
H02P 6/16
See application file for complete search history.

(56) References Cited

U.S. PATENT DOCUMENTS

| | | | |
|---|---|---|---|
| 2012/0286663 A1* | 11/2012 | Puvanakijjakorn | H05B 45/355 315/85 |
| 2014/0139562 A1* | 5/2014 | Nakasu | G09G 3/2003 345/89 |
| 2014/0232408 A1* | 8/2014 | Candy | G01V 3/104 324/329 |
| 2014/0265935 A1* | 9/2014 | Sadwick | H05B 45/56 315/307 |
| 2014/0268918 A1* | 9/2014 | Gong | H02M 3/33523 363/21.15 |
| 2016/0043588 A1* | 2/2016 | Carletti | H02M 1/4225 323/205 |
| 2017/0085183 A1* | 3/2017 | Notsch | H02M 1/44 |
| 2017/0223795 A1* | 8/2017 | Sadwick | H05B 45/18 |
| 2022/0095431 A1* | 3/2022 | Archer | H05B 45/355 |
| 2022/0376613 A1* | 11/2022 | Britton | H02M 7/06 |

* cited by examiner

VOLTAGE RIPPLE DETECTION AND DRIVER CONTROL FOR STABLE OUTPUT CURRENT

CROSS-REFERENCE TO RELATED APPLICATION(S)

This application claims priority to and the benefit of U.S. Provisional Patent Application No. 63/082,835, filed in the United States Patent and Trademark Office on Sep. 24, 2020, the entire disclosure of which is incorporated by reference herein.

FIELD

Aspects of the present invention are related to power supply systems for light sources.

BACKGROUND

A light emitting diode (LED) is an electronic device that converts electrical energy (commonly in the form of electrical current) into light. The light intensity of an LED is primarily based on the magnitude of the driving current. Given that an LED luminosity is very sensitive to drive current changes, in order to obtain a stable luminous output without flicker, it is desirable to drive LEDs by a constant-current source.

Generally, lighting sources are powered by an input AC voltage of 110 or 220 VAC at 50 or 60 Hz line frequency. The input AC voltage is rectified via a rectifier and converted to a desired output voltage level that will be utilized by the LED. As any input power ripple may induce an output voltage ripple and output current ripple, a feedback loop that measures the output of the converter may be used to implement ripple control and to adjust the output signal. However, the output ripple may affect the feedback loop in a way that causes the output signal to be at a DC value that does not reflect the desired value.

The above information disclosed in this Background section is only for enhancement of understanding of the invention, and therefore it may contain information that does not form the prior art that is already known to a person of ordinary skill in the art.

SUMMARY

Aspects of embodiments of the present invention are directed to a power supply system utilizing a secondary-side output correction circuit that generates a feedback control signal, which allows the DC-DC converter to accurately set the DC level of the output signal despite the presence of output ripple. In some embodiments, the output correction circuit is capable of adjusting the feedback control signal based on observed ripple at the output.

According to some embodiments, there is provided a power supply system including: a converter configured to generate an output signal based on a rectified input signal for driving a light source; an output correction circuit coupled to an output of the converter and configured to measure a ripple in the output signal and to generate a correction signal to dynamically control a DC-level of the output signal of the converter based on the measured ripple and a reference signal corresponding to a desired DC-level of the output signal.

In some embodiments, the output signal is an output current or an output voltage of the converter, and the converter is a DC-DC converter.

In some embodiments, wherein the output correction circuit includes: a sense resistor electrically coupled between an output terminal of the converter and the light source driven by the converter; and a current sense circuit coupled to the sense resistor and configured to measure an output current of the converter via the sense resistor, and to generate a sense signal corresponding to the measured output current.

In some embodiments, the output correction circuit includes: a sense resistor configured to sense an output current of the converter; a reference generator configured to generate an adjusted reference signal; and an operational amplifier configured to receive the adjusted reference signal and a sense signal corresponding to the sensed output current, and to generate the correction signal based on a difference between the adjusted reference signal and the sensed output current.

In some embodiments, the reference generator is configured to monitor an output voltage of the converter, to determine a percentage ripple in the output signal based on the monitored output voltage, and to adjust the reference signal based on the percentage ripple.

In some embodiments, the reference generator is further configured to measure a peak-to-peak voltage ripple in the output voltage and a DC-level of the output voltage, and to calculate the percentage ripple based on the peak-to-peak voltage ripple and the DC-level of the output voltage.

In some embodiments, the reference generator is further configured to calculate a correction factor based on the calculated percentage ripple and a look-up table (LUT) including ordered pairs of percentage ripples and associated correction factors.

In some embodiments, the reference generator is further configured to calculate the correction factor by interpolating between two adjacent correction factors stored in the LUT.

In some embodiments, the reference generator is further configured to calculate the adjusted reference signal by multiplying the reference signal by the correction factor.

In some embodiments, the reference generator is further configured to calculate a correction factor based on the calculated percentage ripple and a formula that relates correction factors to percentage ripples.

In some embodiments, the reference generator includes: a memory configured to store a look-up table (LUT) including ordered pairs of percentage ripples and associated correction factors; and a processor configured to calculate a correction factor based on and the LUT including ordered pairs of percentage ripples and associated correction factors, and to calculate the adjusted reference signal based on the reference signal and the correction factor.

In some embodiments, the memory is configured to store a plurality of LUTs corresponding to different values of an output capacitance of the power supply system.

In some embodiments, the reference generator is configured to receive the reference signal from a dimming controller, the reference signal being based on a dimmer setting.

In some embodiments, the output correction circuit is electrically isolated from a primary side of the converter.

In some embodiments, the power supply system further includes: a rectifier configured to rectify an input signal to generate the rectified input signal having a single polarity.

In some embodiments, the output correction circuit is configured to provide the correction signal to the converter, and the converter is configured to regulate a DC-level voltage of the output signal based on the correction signal.

In some embodiments, the power supply system further includes: a power factor correction (PFC) controller coupled to a primary side of the converter, wherein the output correction circuit is configured to provide the correction signal to the PFC controller, and wherein the PFC controller is configured to regulate a DC-level voltage of the output signal based on the correction signal.

In some embodiments, the converter has a primary side and a secondary side electrically isolated from, and inductively coupled to, the primary side.

In some embodiments, the output correction circuit is configured to communicate the correction signal to a primary side of the converter via an optocoupler.

BRIEF DESCRIPTION OF THE DRAWINGS

The accompanying drawings, together with the specification, illustrate example embodiments of the present invention, and, together with the description, serve to explain the principles of the present invention.

DETAILED DESCRIPTION

The detailed description set forth below is intended as a description of example embodiments of power supply system (e.g., an LED driver) with an output correction circuit and driver control system, provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
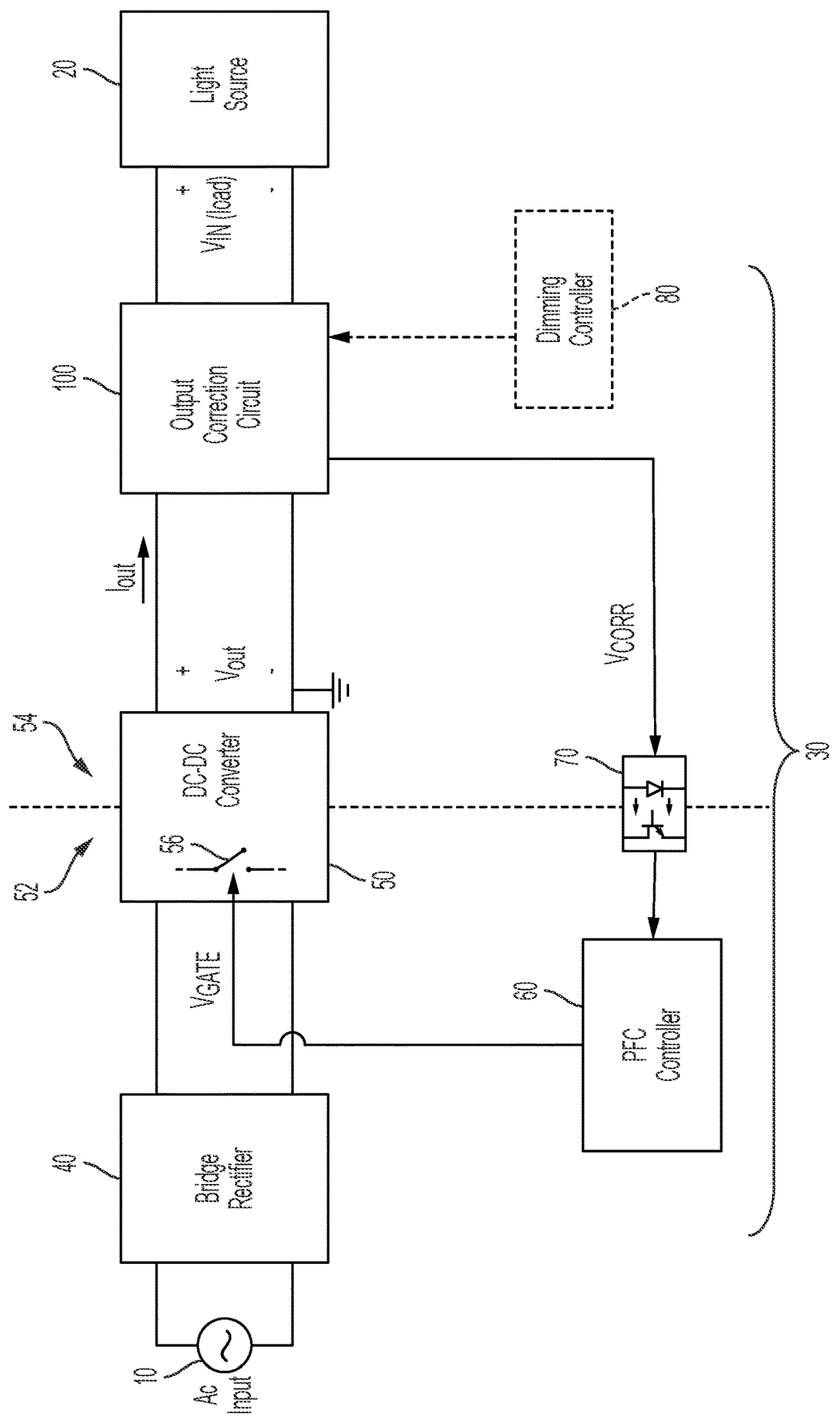
FIG. 1 illustrates a lighting system including a power supply system having an output correction circuit, according to some example embodiments of the present disclosure.

FIG. 1 illustrates a lighting system 1 including a power supply system 30 having an output correction circuit 100, according to some example embodiments of the present disclosure.

According to some embodiments, the lighting system 1 includes an input source 10, a light source 20, and a power supply system 30 (e.g., a switched-mode power supply) for powering and controlling the brightness of the light source 20 based on the signal from the input source 10.

The input source 10 may include an alternating current (AC) power source that may operate at a voltage of 100 Vac, a 120 Vac, a 240 Vac, or 277 Vac, for example. The input source 10 may also include a dimmer electrically powered by said AC power sources. The dimmer may modify (e.g., cut/chop a portion of) the input AC signal according to a dimmer level before sending it to the power supply system 30, and thus variably reduces the electrical power delivered to the power supply system 30 and the light source 20. In some examples, the dimmer may be a TRIAC or ELV dimmer, and may chop the front end or leading edge of the AC input signal. According to some examples, the dimmer interface may be a rocker interface, a tap interface, a slide interface, a rotary interface, or the like. A user may adjust the dimmer level by, for example, adjusting a position of a dimmer lever or a rotation of a rotary dimmer knob, or the like. The light source 20 may include one or more light-emitting-diodes (LEDs) or an arc or gas discharge lamp with electronic ballasts, such as high intensity discharge (HID) or fluorescent lights.

In some embodiments, the power supply system 30 includes a rectifier 40, a converter 50, and an output correction circuit (e.g., a secondary-side output correction circuit) 100.

The rectifier 40 may provide a same polarity of output for either polarity of the AC signal from the input source 10. In some examples, the rectifier 40 may be a full-wave circuit using a center-tapped transformer, a full-wave bridge circuit with four diodes, a half-wave bridge circuit, or a multi-phase rectifier.

The converter (e.g., the DC-DC converter) 50 converts the rectified AC signal generated by the rectifier 40 into a drive signal for powering and controlling the brightness of the light source 20. The drive signal may depend on the type of the one or more LEDs of the light source 20. For example, when the one or more LEDs of the light source 20 are constant current LEDs the drive signal may be a variable voltage signal, and when the light source 20 requires constant voltage, the drive signal may be a variable current signal. In some embodiments, the converter 50 includes a boost converter for maintaining (or attempting to maintain) a constant DC bus voltage on its output while drawing a current that is in phase with and at the same frequency as the line voltage (by virtue of the power factor correction (PFC) controller 60). Another switched-mode converter (e.g., a transformer) inside the converter 50 produces the desired output voltage from the DC bus. The converter has a primary side 52 and a secondary side 54 that is electrically isolated from, and inductively coupled to, the primary side 52. In some examples, the PFC controller 60 may be configured to improve (e.g., increase) the power factor of the load on the input source 10 and reduce the total harmonic distortions (THD) of the power supply system 30. The PFC controller 60 may be external to the converter 50, as shown in FIG. 1, or may be internal to the converter 50.

According to some embodiments, the output correction circuit 100 monitors the output (e.g., the output voltage and current) of the converter 50 on the secondary side and issues a correction signal that is fed back into the primary side 52 of the power supply system 30. The correction signal may be utilized by the PFC controller 60 to drive the main switch 56 within the converter 50, which determines the DC output level of the power supply system 30.

The power supply system 30 may not be able to produce a perfect DC signal at its output and ripples may be present in the output. For example, there may be an inherent sine wave ripple at the output signal, which originates from the line input voltage that is supplied to the power supply system 30. The voltage ripples may affect the DC output current of the power supply system 30, and the peak-to-peak voltage of the ripples may vary significantly depending on load. For example, the output signal may exhibit a smaller peak-to-peak ripple at high voltage loads (e.g., when at high brightness settings or driving a high-voltage LED) and a relatively larger peak-to-peak ripple at low voltage loads (e.g., when at low driver settings or driving a low-voltage LED). In the related art, this ripple may affect the operation of the feedback loop and lead to an error in the DC level of the output signal. That is, the DC level of the output signal may deviate from the desired output value (as, e.g., determined by a brightness setting). For example, when the desired dimmer setting is at 50%, the ripple at the output of the power supply system 30 may cause the output level to be at 49% and not the desired 50%. This error may be particularly pronounced in single stage topologies using a PFC, such as flyback topologies, pure buck converters, or buck-boost converters.

According to some embodiments, the output correction circuit 100 correct for this error to ensure that the DC level of the output signal accurately represents the desired setting. In some embodiments, the output correction circuit 100 measures the ripple of the output voltage $V_{OUT}$ of the converter 50, measures the output current (e.g., instantaneous output current) $I_{OUT}$ of the converter 50, adjusts a reference signal that corresponds to the desired output based on the output voltage VOUT to compensate for the measured ripple, and compares the adjusted reference signal with the measured output current $I_{OUT}$ to generate the correction signal. In some embodiments, the correction signal is used to dynamically control a DC-level of the output signal of the converter 50 based on the measured ripple and the reference signal, which corresponds to the desired DC-level of the output signal.

In some examples, an optocoupler 70 communicates the control signal from the output correction circuit 100 on the secondary side 54 to the primary side 52, while maintaining the electrical isolation between the two sides.

Figure 2:
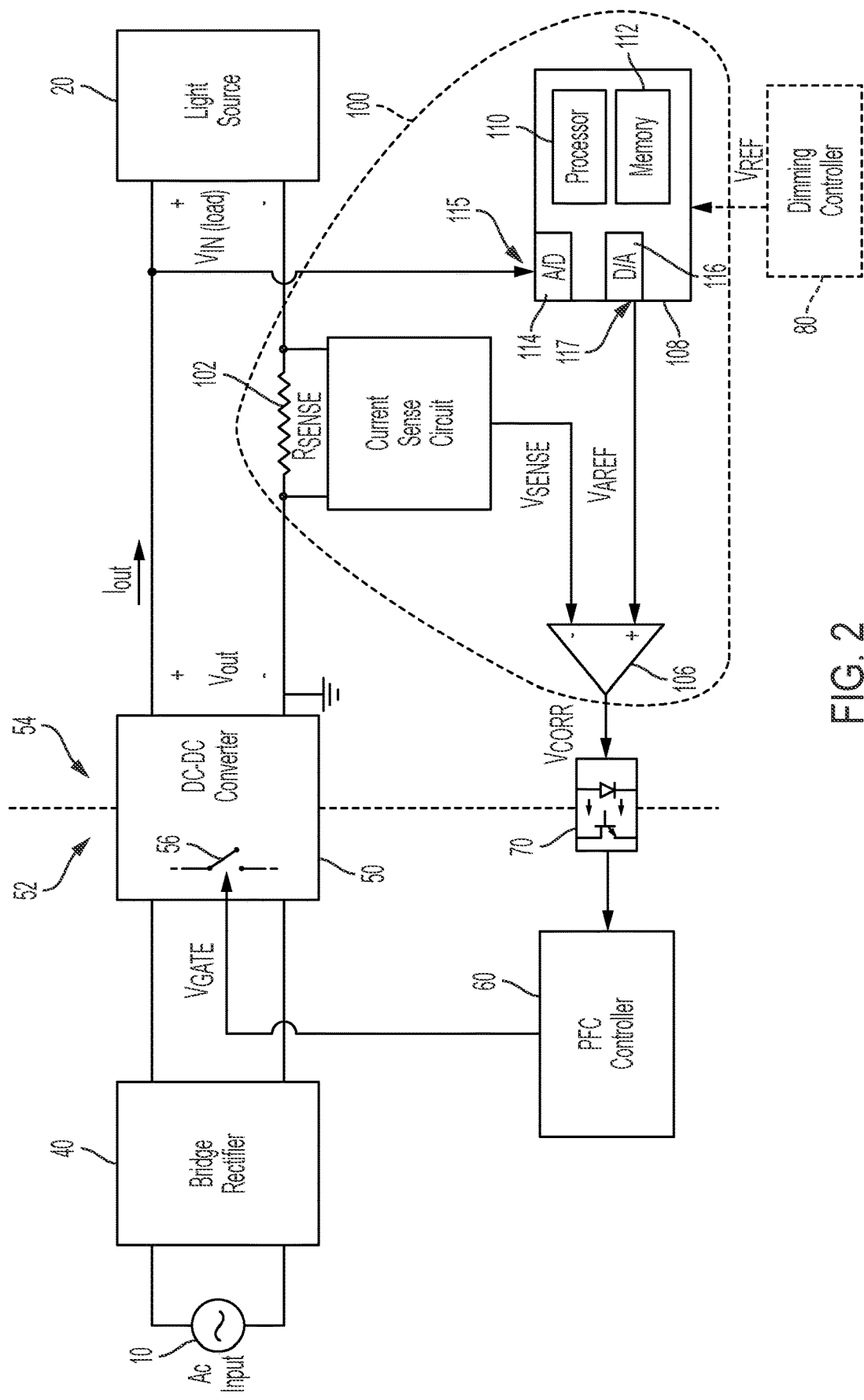
FIG. 2 is a schematic diagram illustrating the output correction circuit within the power supply system, according to some example embodiments of the present disclosure.

FIG. 2 is a schematic diagram illustrating the output correction circuit 100 within the power supply system 30, according to some example embodiments of the present disclosure.

According to some embodiments, the output correction circuit 100 is electrically coupled to the secondary side 54 of the converter 50 and electrically isolated from the primary side 52. The output correction circuit 100 includes sense resistor ($R_{SENSE}$) 102, a current sense circuit 104, an operational amplifier (also referred to as an error amplifier) 106, and a reference generator (e.g., a reference voltage or current generator) 108. The sense resistor 102 may be positioned between an output terminal (e.g., a reference/ground terminal) of the converter 50 and the light source 20 and is connected electrically in series with the light source 20. In some examples, the sense resistor may be about 50 mΩ to about 1 Ω.

In some embodiments, the current sense circuit 104 measures the output current $I_{OUT}$ of the converter 50 via the sense resistor 102, and provides a sense signal (e.g., a sense voltage) $V_{SENSE}$ corresponding to the measured output current $I_{OUT}$ to the first input terminal (e.g., the negative terminal) of the error amplifier 106 to compare with an adjusted reference signal (e.g., an adjusted reference current/voltage) $V_{AREF}$ supplied by the reference generator 108. In some examples, the sense signal $V_{SENSE}$ is the voltage drop across the sense resistor 102. The correction signal (also referred to as a corrected control signal) $V_{CORR}$ that is then generated by the error amplifier 108 is used by the PFC controller 70 to control the main gate 56 of the converter 50 (e.g., via a gate control signal $V_{GATE}$), which in turn controls/adjusts the voltage level of the converter output $V_{out}$. In some examples, the optocoupler 70 transmits the correction signal $V_{CORR}$ across the primary-secondary barrier to the PFC controller 70, while maintaining electrical isolation between the primary and secondary sides 52 and 54.

According to some embodiments, the reference generator 108 includes a processor (e.g., a programmable microprocessor) 110, a memory (e.g., a storage memory) 112, an analog-to-digital (A/D) converter 114 at an input terminal (e.g., a sample terminal) 115, and a digital-to-analog (D/A) converter 116 at an output terminal 117. The sample terminal of the reference generator 108 is electrically coupled to the output of the converter 50 and samples (e.g., measures) the output voltage $V_{out}$ of the converter 50. The A/D converter converts the readings to digital binary form for further processing by the processor 110.

In some embodiments, processor 110 calculates the voltage ripple (e.g., the peak-to-peak voltage ripple) at the output of the converter 50 based on the measurements captured by the A/D converter 116 and uses it to modify/adjust a reference signal that corresponds to the DC value that output signal (e.g., output current or voltage) of the converter 50 is to be regulated to. The D/A converter 116 converts the adjusted reference signal, which may be in digital binary format, to an analog signal to be supplied to the error amplifier 106 (e.g., to the positive input terminal of the error amplifier 106) via the output terminal 117.

The reference signal $V_{REF}$ may be a fixed/constant value stored at the memory 112 or may be variable signal provided from an external circuit. In examples in which the light source 20 is a dimmable light (e.g., a dimmable LED), a dimming controller 80 may generate the reference signal $V_{REF}$ based on a dimmer setting (e.g., a brightness setting ranging from 0-100%) and provide the signal to the processor 110.

In the absence of any ripple in the output signal, providing the reference signal VREF to error amplifier 106 may result in the output signal (e.g., $V_{OUT}$ or $I_{OUT}$) regulating to the desired value associated with the reference signal $V_{REF}$. However, the presence of ripple at the output of the converter 50 may cause deviations in the output signal from the desired value. In some examples, the ripple percentage (e.g., peak-to-peak ripple percentage) may be about 5% to about 40% of the DC-level at the converter output.

According to some embodiments, by observing the output of the converter 50, the output correction circuit 100 determines the peak-to-peak voltage ripple ($V_{PP}$) and the actual DC voltage level of output signal ($V_{OUT}(DC)$) in real-time, and calculates the percentage ripple (% ripple) as $$\% \text{ ripple} = V_{PP}/V_{OUT}(DC) * 100\%. \quad \text{(Eq. 1)}$$

In some embodiments, the output correction circuit 100 then corrects/adjusts the reference signal ($V_{REF}$) based on the percentage ripple (e.g., a real-time percentage ripple) using a look-up table (LUT) or a formula. According to some embodiments, the LUT or formula correlate various percentage ripples at the output of the power supply system 30 to different scaling/correction factors for compensating the reference signal. The formula may express correction factor as a function of percentage ripples.

Once the correction factor (CF) is determined, the output correction circuit 100 calculates the adjusted reference signal ($V_{AREF}$) as $$V_{AREF} = CF * V_{REF} \quad \text{(Eq. 2)}$$

By compensating for the effect of ripple on the feedback loop, the adjusted reference signal may lead to an output signal (e.g., an output current $I_{OUT}$ and/or an output voltage $V_{OUT}$) whose DC level more closely matches the desired output DC level (as, e.g., determined by the dimmer setting) than the original reference signal.

As the output capacitance $C_{OUT}$ of the converter 50 may have an effect on the output ripple, in some embodiments, the processor 110 uses different LUTs or formulas for different output capacitance $C_{OUT}$ values. As the LUT(s) or formula(s) utilize percent ripple, as opposed to absolute ripple values, the correction factors are not dependent on (e.g., not a function of) the DC level of the output signal. That is, the correction factor for a given ripple percentage is equally applicable to output signals having different DC levels. For example, the same LUT or formula may be used for different dimmer settings and different LEDs. The LUT(s) and formula(s) may be stored at the memory 112 for fast retrieval by the processor 110.

Table 1 below illustrates examples of LUTs for three different output capacitance values, according to some example embodiments of the present disclosure.

TABLE 1

| Cout = 2700 µF | | | Cout = 2200 µF | | | Cout = 1500 µF | | |
|---|---|---|---|---|---|---|---|---|
| Vout (v) | % Ripple | Correction Factor (CF) | Vout (v) | % Ripple | Correction Factor (CF) | Vout (v) | % Ripple | Correction Factor (CF) |
| [0, 10) | 0 | 0.9918 | [0, 10) | 0 | 0.9976 | [0, 10) | 0 | 1.0000 |
| [10, 19) | 3.94 | 0.9918 | [10, 11) | 4.51 | 0.9976 | [10, 11) | 6.02 | 1.0000 |
|  | 7.18 | 1.0000 |  | 8.54 | 1.0153 | [11, 19) | 1.08 | 1.0382 |
|  | 9.42 | 1.0321 | [11, 19) | 2.70 | 1.0571 |  | 2.68 | 1.0610 |
| [19, 20) | 0.00 | 1.0321 | [19, 20) | 0.00 | 1.0571 |  | 4.52 | 1.0714 |
| [20, 29) | 0.00 | 0.9883 | [20, 29) | 0.00 | 0.9860 |  | 6.78 | 1.0857 |
|  | 2.16 | 0.9883 |  | 2.57 | 0.9860 | [19, 20) | 0.00 | 1.0857 |
|  | 4.04 | 0.9923 |  | 5.49 | 1.0076 | [20, 29) | 0.00 | 0.9918 |
|  | 5.23 | 1.0030 |  | 7.28 | 1.0264 |  | 3.40 | 0.9918 |
|  | 5.99 | 1.0085 | [29, 30) | 0.00 | 1.0264 |  | 7.36 | 1.0397 |
| [29, 30) | 0.00 | 1.0085 | [30, 39) | 0.00 | 0.9800 |  | 9.87 | 1.0500 |
| [30, 39) | 0.00 | 0.9849 |  | 1.88 | 0.9800 | [29, 30) | 0.00 | 1.0500 |
|  | 1.48 | 0.9849 |  | 3.62 | 1.0100 | [30, 39) | 0.00 | 0.9918 |
|  | 2.66 | 0.9902 |  | 4.76 | 1.0178 |  | 2.49 | 0.9918 |
|  | 3.04 | 1.0100 |  | 5.48 | 1.0264 |  | 4.87 | 1.0150 |
|  | 3.39 | 0.9950 | [39, 40) | 0.00 | 1.0464 |  | 5.46 | 1.0300 |
|  | 4.00 | 1.0107 | [40, 49) | 0.00 | 0.9837 |  | 7.17 | 1.0450 |
|  | 4.41 | 1.0107 |  | 1.28 | 0.9837 | [39, 40) | 0.00 | 1.0450 |
|  | 5.00 | 1.0300 |  | 1.34 | 0.9800 | [40, 49) | 0.00 | 0.9860 |
| [39, 40) | 0.00 | 1.0500 |  | 1.46 | 0.9750 |  | 1.91 | 0.9860 |
| [40, 100) | 0.00 | 0.9825 |  | 2.72 | 0.9897 |  | 3.05 | 0.9964 |
|  | 1.19 | 0.9825 |  | 3.08 | 0.9938 |  | 5.49 | 1.0110 |
|  | 2.56 | 0.9877 | [49, 50) | 0.00 | 0.9938 |  | 5.60 | 1.0300 |
|  | 3.24 | 0.9908 | [50, 100) | 0.00 | 0.9864 | [49, 50) | 0.00 | 1.0110 |
| >=100 | 0.00 | 1.0000 |  | 1.82 | 0.9864 | [50, 100) | 0.00 | 0.9856 |
|  |  |  |  | 2.46 | 0.9898 |  | 1.73 | 0.9856 |
|  |  |  | >=100 | 0.00 | 0.9898 |  | 3.33 | 1.0100 |
|  |  |  |  |  |  | >=100 | 0.00 | 1.0100 |

As shown in Table 1, in some embodiments, the LUT includes, for each output voltage range, ordered pairs of percentage ripples and associated correction factors. In some examples, the correction factors tabulated in the LUT(s) may be determined experimentally as values needed to achieve a desired DC level for the output signal given different percentage ripple values.

As will be understood by a person of ordinary skill in the art, the values and ranges provided in Table 1 are only provided as an example, and may be changes to any other suitable values and ranges depending on the application.

In some embodiments, when a calculated percentage ripple matches one of the values in the LUT, the processor 110 uses the corresponding correction factor to adjust the reference signal. When, within a particular output voltage range, a percentage ripple value falls between a first percentage value and a second percentage value from the LUT, the processor 110 calculates the correction factor CF by performing interpolation (e.g., linear interpolation) between first and second correction factors corresponding to the first and second percentage values. In some examples, the interpolation operation performed by the processor 110 may be expressed in code as:

```
if (input <= inputPoint[0]) // inputPoint[0] being a first tabulated % ripple
    result = outputPoint[0]; // outputPoint[0] being a first tabulated CF
else if (input >= inputPoint[numPoints-1]) // numPoints = No. of tabulated % ripple values
    result = outputPoint[numPoints-1];
else
{
    // Bracket the steps, find where point lies within the input range
    for (i=0; i<(numPoints-1); i++)
        if ((input > inputPoint[i]) && (input <= inputPoint[i+1]))
            range = i;
```

-continued

```
    // Calculate the step-delta between the two points
    if ((inputPoint[range+1] - inputPoint[range]) != 0) // catch /0
        delta = (outputPoint[range+1] - outputPoint[range]) * 100 / (inputPoint[range+1] - inputPoint[range]);
    else
        delta = 1.0;
    // Add or subtract the scaled location * delta, to the lower point
    result = outputPoint[range] + (delta * (input - inputPoint[range])) / 100;
}
```

Accordingly, as described above, the power supply system 30 utilizes the output correction circuit 100 to compensate for the deviation caused in the DC-level of the output signal of the power supply system by the ripple present in the output signal. In some embodiments, the output correction circuit 100 monitors the peak-to-peak ripple in the output signal of the power supply system and provides an adjusted reference signal to the error amplifier to compensate for the effect of the observed ripple on the DC-level of the output signal. This allows the power supply system to deliver a more accurate and precise current level to the load.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the inventive concept". Also, the term "exemplary" is intended to refer to an example or illustration.

As used herein, the terms "use", "using", and "used" may be considered synonymous with the terms "utilize", "utilizing", and "utilized", respectively.

The power supply system with the output correction circuit and/or any other relevant devices or components according to embodiments of the present invention described herein may be implemented by utilizing any suitable hardware, firmware (e.g., an application-specific integrated circuit), software, or a suitable combination of software, firmware, and hardware. For example, the various components of the independent multi-source display device may be formed on one integrated circuit (IC) chip or on separate IC chips. Further, the various components of the LED driver may be implemented on a flexible printed circuit film, a tape carrier package (TCP), a printed circuit board (PCB), or formed on the same substrate. Further, the various components of the LED driver may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A power supply system comprising:
    a converter configured to generate an output signal based on a rectified input signal for driving a light source; and
    an output correction circuit coupled to an output of the converter and configured to measure a ripple in the output signal and to generate a correction signal to dynamically control a DC-level of the output signal of the converter based on the measured ripple and a reference signal corresponding to a desired DC-level of the output signal, the output correction circuit being further configured to:
        determine a percentage ripple in the output signal;
        calculate a correction factor based on the percentage ripple and a look-up table (LUT) comprising ordered pairs of percentage ripples and associated correction factors;
        adjust the reference signal based on the correction factor to generate an adjusted reference signal; and
        generate the correction signal based on a difference between the adjusted reference signal and an output current of the converter.

2. The power supply system of claim 1, wherein the output signal is an output current or an output voltage of the converter, and
    wherein the converter is a DC-DC converter.

3. The power supply system of claim 1, wherein the output correction circuit comprises:
    a sense resistor electrically coupled between an output terminal of the converter and the light source driven by the converter; and
    a current sense circuit coupled to the sense resistor and configured to measure the output current of the converter via the sense resistor, and to generate a sense signal corresponding to the measured output current.

4. The power supply system of claim 1, wherein the output correction circuit comprises:
    a sense resistor configured to sense the output current of the converter;
    a reference generator configured to generate the adjusted reference signal; and
    an operational amplifier configured to receive the adjusted reference signal and a sense signal corresponding to the sensed output current, and to generate the correction signal.

5. The power supply system of claim 4, wherein the reference generator is configured to monitor an output voltage of the converter, to determine the percentage ripple in the output signal based on the monitored output voltage, and to adjust the reference signal.

6. The power supply system of claim 5, wherein the reference generator is further configured to measure a peak-to-peak voltage ripple in the output voltage and a DC-level of the output voltage, and to calculate the percentage ripple based on the peak-to-peak voltage ripple and the DC-level of the output voltage.

7. The power supply system of claim 5, wherein the reference generator is further configured to calculate the correction factor.

8. The power supply system of claim 7, wherein the reference generator is further configured to calculate the correction factor by interpolating between two adjacent correction factors stored in the LUT.

9. The power supply system of claim 7, wherein the reference generator is further configured to calculate the adjusted reference signal by multiplying the reference signal by the correction factor.

10. The power supply system of claim 5, wherein the reference generator comprises:
a memory configured to store the LUT; and
a processor configured to calculate the correction factor, and to calculate the adjusted reference signal based on the reference signal and the correction factor.

11. The power supply system of claim 10, wherein the memory is configured to store a plurality of LUTs corresponding to different values of an output capacitance of the power supply system.

12. The power supply system of claim 5, wherein the reference generator is configured to receive the reference signal from a dimming controller, the reference signal being based on a dimmer setting.

13. The power supply system of claim 1, wherein the output correction circuit is electrically isolated from a primary side of the converter.

14. The power supply system of claim 1, further comprising:
a rectifier configured to rectify an input signal to generate the rectified input signal having a single polarity.

15. The power supply system of claim 1, wherein the output correction circuit is configured to provide the correction signal to the converter, and
wherein the converter is configured to regulate a DC-level voltage of the output signal based on the correction signal.

16. The power supply system of claim 1, further comprising:
a power factor correction (PFC) controller coupled to a primary side of the converter,
wherein the output correction circuit is configured to provide the correction signal to the PFC controller, and
wherein the PFC controller is configured to regulate a DC-level voltage of the output signal based on the correction signal.

17. The power supply system of claim 1, wherein the converter has a primary side and a secondary side electrically isolated from, and inductively coupled to, the primary side.

18. The power supply system of claim 12, wherein the output correction circuit is configured to communicate the correction signal to a primary side of the converter via an optocoupler.

19. A power supply system comprising:
a converter configured to generate an output signal based on a rectified input signal for driving a light source; and
an output correction circuit coupled to an output of the converter and configured to measure a ripple in the output signal and to generate a correction signal to dynamically control a DC-level of the output signal of the converter based on the measured ripple and a reference signal corresponding to a desired DC-level of the output signal, the output correction circuit being further configured to:
determine a percentage ripple in the output signal;
calculate a correction factor based on the percentage ripple and a formula that relates correction factors to percentage ripples;
adjust the reference signal based on the correction factor to generate an adjusted reference signal; and
generate the correction signal based on a difference between the adjusted reference signal and an output current of the converter.

* * * * *